(12) United States Patent
Tiscareño et al.

(10) Patent No.: US 8,366,390 B2
(45) Date of Patent: Feb. 5, 2013

(54) LUBRICATION SYSTEM AND WIND TURBINE INCORPORATING SAME

(75) Inventors: Aquiles Tiscareño, Queretaro (MX); Elias Marquez, Queretaro (MX); Francisco Corona, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/291,266

(22) Filed: Nov. 8, 2011

(65) Prior Publication Data
US 2012/0134831 A1     May 31, 2012

(51) Int. Cl.
*F03D 1/00*     (2006.01)
*F16L 51/02*    (2006.01)
(52) U.S. Cl. ........... 416/61; 415/112; 384/473; 384/475
(58) Field of Classification Search .................. 415/110, 415/111, 112, 117; 416/61, 174; 184/4, 184/6.12; 384/462, 471, 473, 474, 475
See application file for complete search history.

(56) References Cited

U.S. PATENT DOCUMENTS

| | | | | |
|---|---|---|---|---|
| 4,174,031 A * | 11/1979 | MacLeod | ...................... | 198/501 |
| 4,366,746 A * | 1/1983 | Rosecrans | ...................... | 91/467 |
| 4,697,933 A * | 10/1987 | Morita | ............................. | 384/12 |
| 5,628,248 A * | 5/1997 | Oen et al. | ...................... | 100/282 |
| 6,991,378 B2 * | 1/2006 | Jacquemont et al. | ......... | 384/471 |
| 7,690,246 B1 * | 4/2010 | Discenzo | ..................... | 73/53.05 |
| 2005/0281499 A1 * | 12/2005 | Wojtkowski et al. | ......... | 384/473 |
| 2008/0099280 A1 | 5/2008 | Kroh et al. | | |
| 2010/0068055 A1 | 3/2010 | Garcia I Erill | | |
| 2010/0124507 A1 | 5/2010 | Wallace et al. | | |

FOREIGN PATENT DOCUMENTS

| EP | 0297323 | * | 6/1988 |
|---|---|---|---|
| ES | 2199677 | * | 1/2005 |

* cited by examiner

*Primary Examiner* — Edward Look
*Assistant Examiner* — Liam McDowell
(74) *Attorney, Agent, or Firm* — James W. Pemrick; Ernest G. Cusick; Frank A. Landgraff

(57) ABSTRACT

A lubrication system and wind turbine are provided having one or more input ports in a component and one or more output ports in the component. An expandable lubrication receptacle is connected to the one or more output ports, and the expandable lubrication receptacle is configured for receiving a lubrication medium from the component.

16 Claims, 6 Drawing Sheets

LUBRICATION SYSTEM AND WIND TURBINE INCORPORATING SAME

BACKGROUND OF THE INVENTION

The subject matter disclosed herein relates generally to a lubrication system. More specifically, the subject matter disclosed herein relates to a lubrication system for a wind turbine.

Wind turbines need to be inspected and serviced on a regular basis to keep them operating reliably and effectively. However, damage invariably occurs to the wind turbine either from external effects (e.g., lightning, wind, rain, hail, etc.) or from general wear and tear leading to fatigue of various components.

The bearings and drives of the wind turbine need inspection and service, and typically a technician must climb the tower and enter the nacelle. This is a time consuming and labor intensive activity. In addition, there are limits placed on the number of climbs any one technician can perform per day. This can be particularly problematic when a wind farm has a large number of wind turbines, and each wind turbine needs to be inspected and/or serviced. Further, wind turbines typically must be shut down when personnel are inside the wind turbine, and this reduces the production capability of the wind turbine currently undergoing an inspection. Some wind turbine sites may be difficult to reach, as they may be located off-shore or in isolated and difficult to reach locations.

The bearings and drives may be lubricated with grease, and this grease must be injected into the target component at pre-determined intervals of time. As the grease is injected into the component, some of the grease may be forced out of the component. Grease may also be forced out during use and operation of the wind turbine. Typically, grease is forced out of seals and this excess grease may undesirably accumulate on exterior surfaces of the component, exterior portions of the wind turbine, or on interior portions of the wind turbine, such as floors or walkways. A potentially hazardous working environment could be created by grease that undesirably accumulates on floors, ladders or walkways. Grease that accumulates on exterior portions of the wind turbine can also deter from the aesthetic appearance of the wind turbine.

BRIEF DESCRIPTION OF THE INVENTION

In an aspect of the present invention, a lubrication system is provided having one or more input ports in a component and one or more output ports in the component. An expandable lubrication receptacle is connected to the one or more output ports, and the expandable lubrication receptacle is configured for receiving a lubrication medium from the component.

In another aspect of the present invention, a wind turbine is provided having a tower, a nacelle supported by the tower, and a rotor including one or more rotor blades. A lubrication system includes one or more input ports in a component and one or more output ports in the component. An expandable lubrication receptacle is connected to the one or more output ports, and the lubrication receptacle is configured for receiving a lubrication medium from the component.

In yet another aspect of the present invention, a lubrication system is provided having one or more input ports and one or more output ports in a component. An expandable lubrication receptacle is connected to the one or more output ports, and the expandable lubrication receptacle wraps around at least a portion of the component. The expandable lubrication receptacle is configured for receiving a lubrication medium from the component.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments that also incorporate the recited features.

Figure 1:
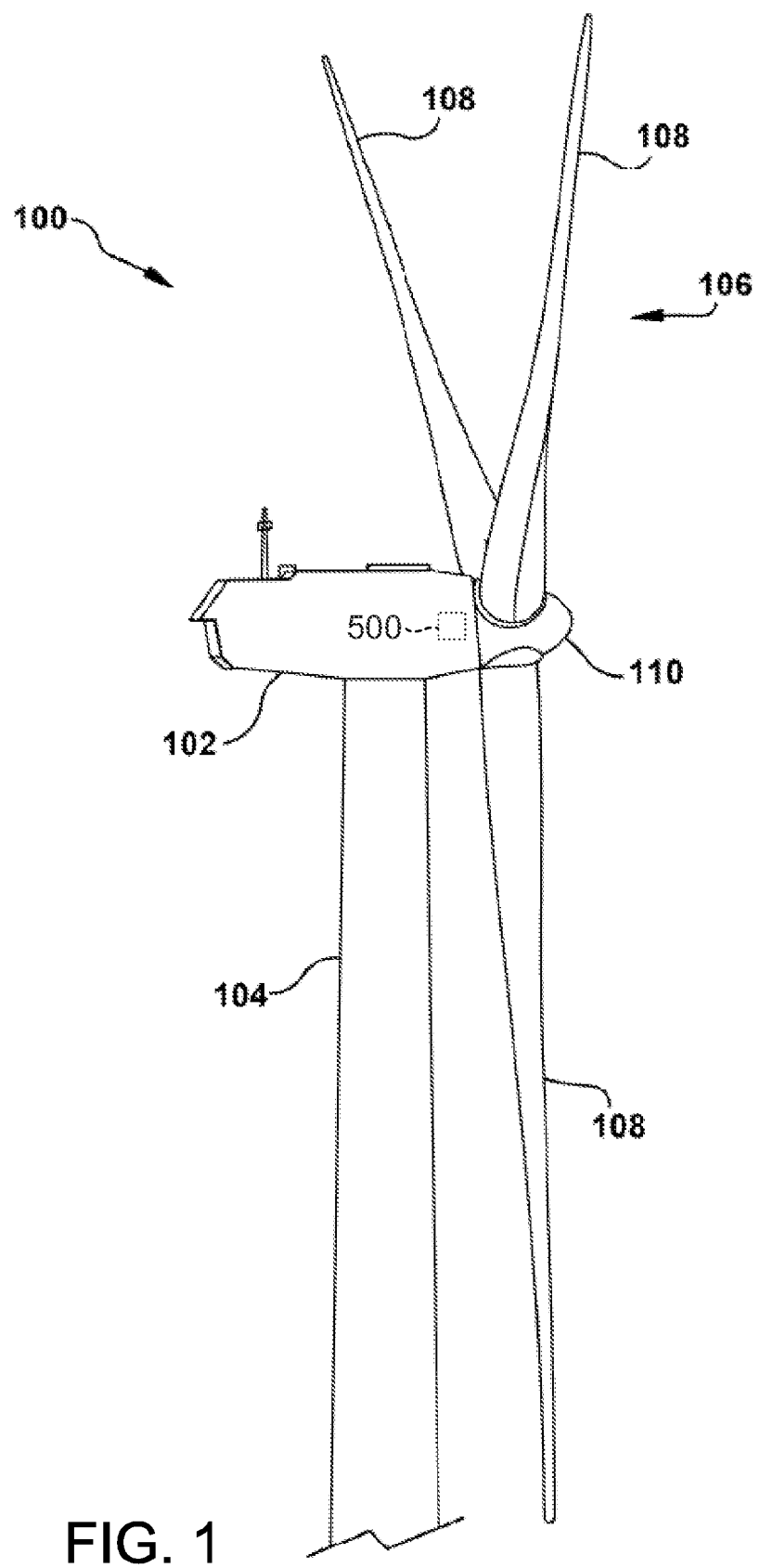
FIG. 1 is a partial side elevational illustration of a wind turbine, according to an aspect of the present invention.

In some configurations and referring to FIG. 1, a wind turbine 100 comprises a nacelle 102 housing a generator (not shown in FIG. 1). Nacelle 102 is supported by and mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
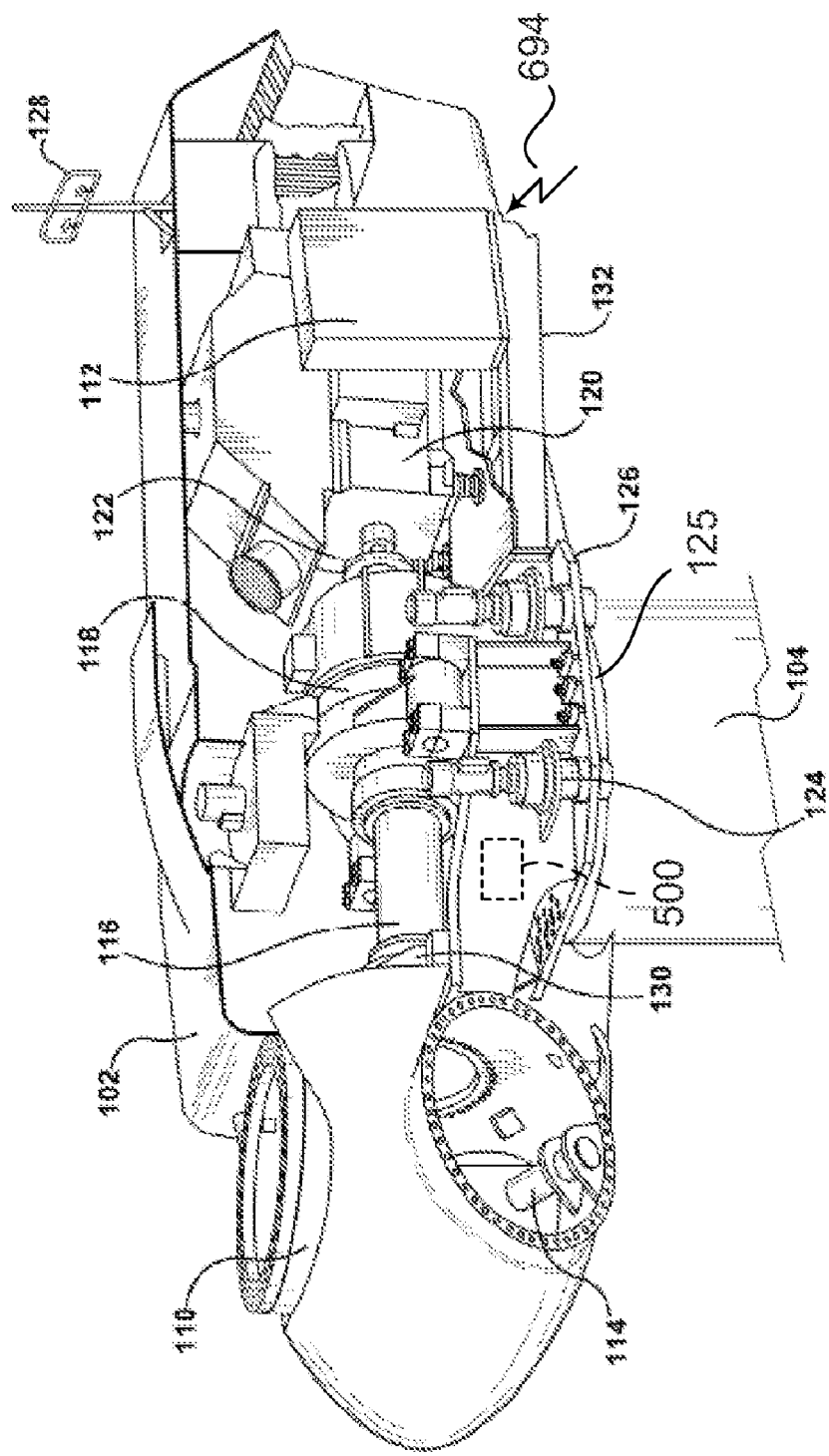
FIG. 2 is a partial perspective illustration of the interior of the nacelle of the wind turbine of FIG. 1, according to an aspect of the present invention.

Referring to FIG. 2, various components are housed in nacelle 102 or in tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations. A variable blade pitch drive 114 may be provided to control the pitch of blades 108 (not shown in FIG. 2) that drive hub 110 as a result of wind. The pitch angles of blades 108 may be individually controlled by blade pitch drive 114. Hub 110 and blades 108 together comprise wind turbine rotor 106 (not shown in entirety in FIG. 2).

The drive train of the wind turbine includes a main rotor shaft 116 (also referred to as a "low speed shaft") connected to hub 110 via main bearing 130 and (in some configurations), at an opposite end of shaft 116 to a gear box 118. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 132. In some configurations, rotor torque is transmitted via coupling 122. In some configurations of the present invention, generator 120 is a direct drive permanent magnet generator. Yaw drive 124, yaw bearing 125 and yaw deck 126 provide a yaw orientation system for wind turbine 100. A meteorological boom 128 provides information for a turbine control system, which may include wind direction and/or wind speed. In some configurations, the yaw system is mounted on a flange provided atop tower 104.

Figure 3:
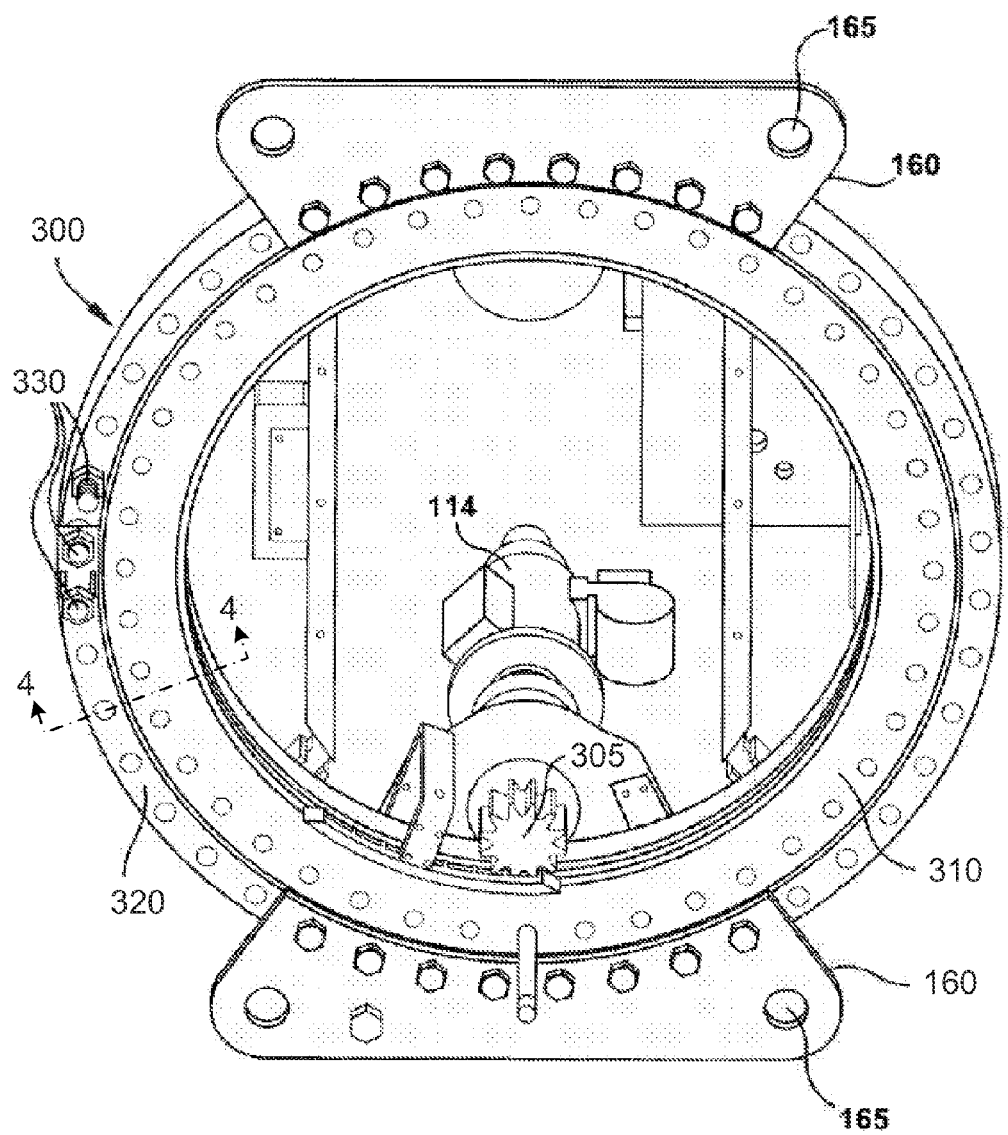
FIG. 3 illustrates a perspective view of a pitch drive and pitch bearing.

FIG. 3 illustrates a perspective view of a pitch drive and pitch bearing 300 of the rotor hub with a removed blade for clarity. The pitch drive 114, which is firmly fixed to rotor hub 110, may be mounted inside the rotor hub. Drive element 305 of pitch drive 114 may be a gear wheel, which interacts with the inner gear rim of inner flange 310. Flange 310 may be firmly attached to a rotor blade and is rotatably located within rotor hub 110 (i.e., the rotor blade is attached to the rotating portion of the pitch bearing). Thus, pitch drive 114 enables a swiveling movement of its corresponding rotor blade, whereby the swivel axis of the rotor blade is roughly parallel to the longitudinal axis of the blade. Outer flange 320 may hold a stationary race for the rotor blade or pitch bearing and is bolted with a plurality of peripheral bolts 330 to the rotor hub 110. Lifting ears 160 with holes 165 may optionally be present and may be used for raising or lowering the hub. The pitch bearing is comprised of inner flange 310 and outer flange 320.

Figure 4:
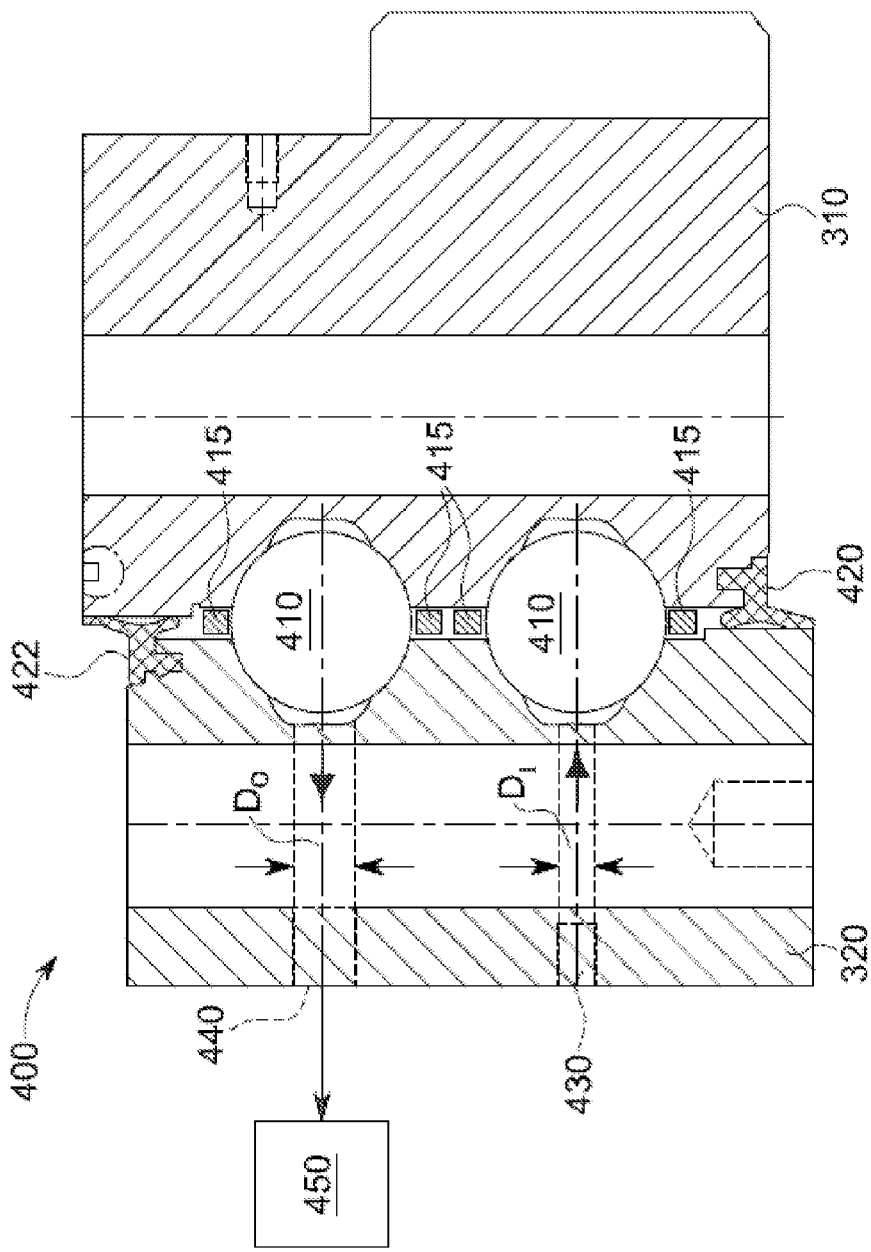
FIG. 4 illustrates a partial, cross-sectional view of a pitch bearing, according to an aspect of the present invention.

FIG. 4 illustrates a partial, cross-sectional view of a pitch bearing 400 that may be used for a blade of a wind turbine, according to a view along section line 4-4 in FIG. 3 and to an aspect of the present invention. The pitch bearing 400, yaw bearing 125, main bearing 130, generator bearing (not shown) or any other bearing or item requiring lubrication may be considered a component or components of wind turbine 100. The outer flange 320 is fixed and bolted to the rotor hub 110. The inner flange 310 is connected to a rotor blade and is configured to rotate about a central axis (not shown). A plurality of rolling elements 410 are located between the inner flange 310 and the outer flange 320. The rolling elements may comprise ball bearings, spherical elements, cylindrical bearings, tapered roller bearings, or any other suitable friction reducing element. The rolling elements may be arranged in one, two or more rows as desired in the specific application. In some applications, a cage 415 may be used in conjunction with the rolling elements, and the cage 415 helps to stabilize the tangential or circumferential position of the rolling elements.

An inner seal 420 and an outer seal 422 may be formed of a resilient and/or elastomeric material and function to prevent or reduce infiltration of unwanted material (e.g., dirt, dust, water, etc.) or escape of desired lubrication fluids. For example, a lubricant (e.g., grease) may be desired between the inner flange 310 and outer flange 320 as well as around the rolling elements 410. The lubricant reduces friction and wear, thereby increasing longevity of the bearing 400. The lubricant is injected into bearing 400 via one or more input ports 430 having a first diameter $D_I$. The input port 430 may be a grease fitting configured for use with a grease gun or grease supply connection. Excess lubricant may be routed out of bearing 400 through one or more output ports 440 having a second diameter $D_O$. The second diameter $D_O$ is larger than the first diameter $D_I$. As non-limiting examples only, the first diameter $D_I$ may be in the range of about 8-14 mm and the second diameter $D_O$ may be in the range of about 14-20 mm, however, any suitable range of diameters may be used as desired in the specific application. It is desirable to reduce or eliminate lubricant leakage through seals 420, 422 as this leaked lubricant could damage the seals and/or accumulate on undesired surfaces. Therefore, the larger diameter output port 440 (compared to the diameter of input port 430) provides a lower flow resistance for the lubricant compared to either the input port 430 or the seals 420, 422.

During operation of the bearing 400, lubricant may be forced out of the bearing due to mechanical loads, temperature increases or other forces. Lubricant may also be forced out of bearing 400 by the addition of new lubricant forced through input ports 430. As embodied by an aspect of the present invention, a lubricant or lubrication receptacle 450 can be connected to the one or more output ports to capture or receive the excess or expelled lubricant or lubrication medium.

Figure 5:
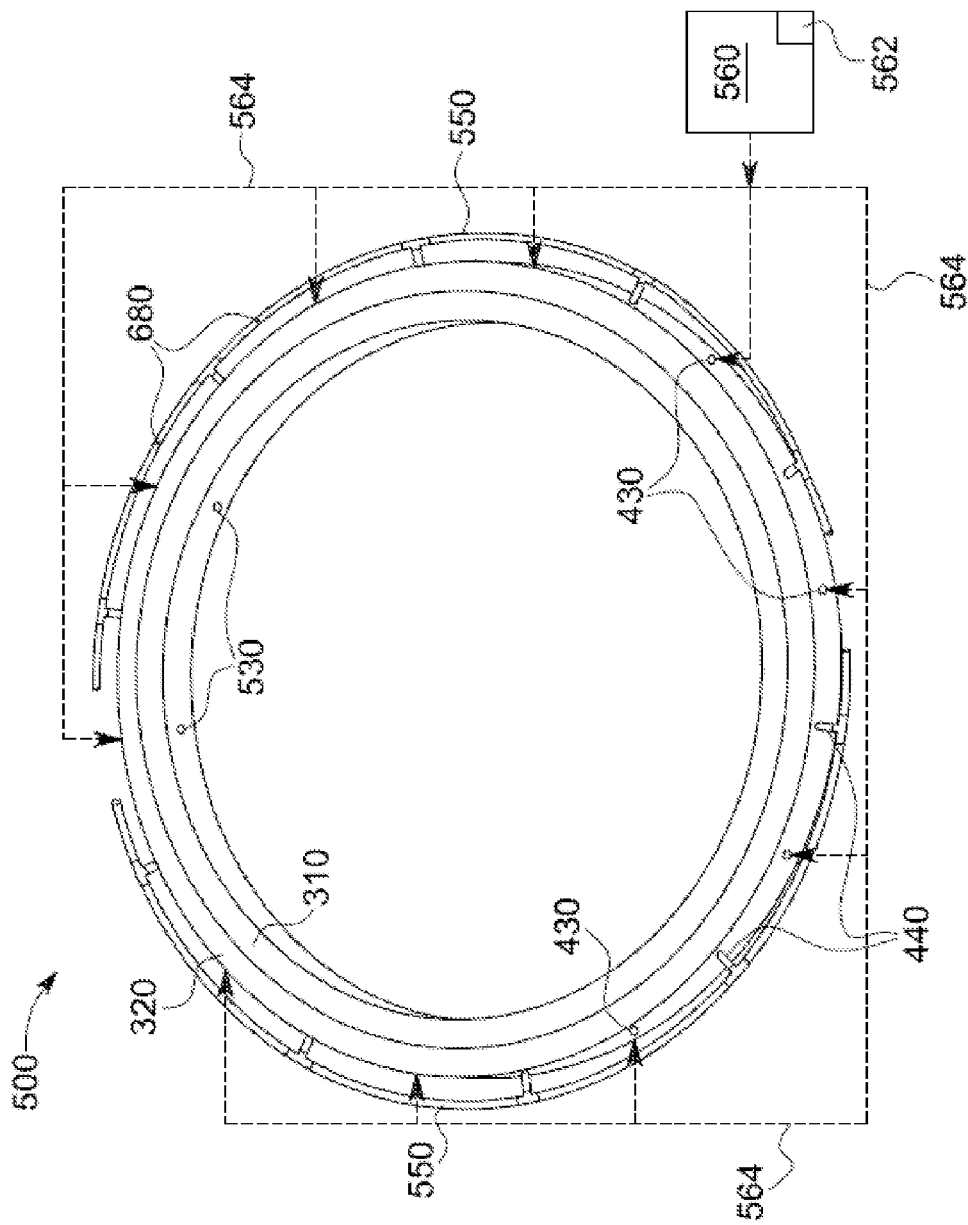
FIG. 5 illustrates a simplified perspective view of a lubrication system, according to an aspect of the present invention.

FIG. 5 illustrates a simplified perspective view of a lubrication system 500, according to an aspect of the present invention. Lubrication system 500 includes a component needing lubrication, such as a bearing comprised of inner flange 310 and outer flange 320. One or more input ports 430 may be located on or in outer flange 320. Alternatively, or in addition to input ports 430, one or more input ports 530 may be located on or in inner flange 310. An expandable lubrication receptacle 550 is connected to a plurality of the one or more output ports 440. The expandable lubrication receptacle 550 may comprise any suitable device, and as one non-limiting example, the lubricant or lubrication receptacle may comprise a lay-flat or collapsible-type hose. For example, one such expandable or collapsible hose is a discharge hose formed of an outer polyester cover jacket and an inner elastomeric or rubber liner. Diameters of the collapsible-type hose may range from about 1 inch to about 6 inches, but any suitable diameter may be used as desired in the specific application. A polyester/elastomeric hose may also withstand internal pressures of about 150 PSI and may maintain flexibility and integrity in a temperature range of about −25 F to about 185 F. However, lubrication receptacles with qualities outside the given ranges may also be employed as desired in the specific application. In the example shown in FIG. 5, two lubrication receptacles 550 are shown connected to multiple output ports 440, however, it is to be understood that one, two, three or more lubrication receptacles could be employed as desired. Further, the expandable lubrication receptacle 550 may be configured to wrap around at least a portion of the component. As non-limiting examples only, the expandable lubrication receptacle 550 could extend or wrap around about one fourth, about one third or about one half of the component (e.g., a bearing), or any other suitable amount as desired in the specific application. The expandable lubrication receptacle 550 can be initially installed in a collapsed state, and then as the lubricant medium (e.g., grease) fills the receptacle, the receptacle (or hose) would expand. One advantage provided by the lubrication receptacle, according to an aspect of the present invention, is that that the lubrication receptacle is capable of capturing large volumes of lubricant (e.g., grease), thereby extending maintenance intervals. This would be highly desirable in remotely located wind turbines, or in wind farms having a large number of wind turbines. The lubrication receptacle may also be purged or cleaned for re-use, and the lubricant previously contained therein may also be recycled and/or re-used.

A lubricant supply or lubrication supply 560, containing a lubrication medium 562, may also be connected to the one or more input ports 430 and/or 530. The input ports 430/530 may be equally distributed about the component to permit substantially equal distribution of the lubricant medium. Any suitable supply conduit 564 may be used to transport the lubrication medium from the lubricant supply to the various input ports 430 and/or 530. The lubrication medium may be grease, synthetic grease, oil, synthetic oil, combinations thereof or any other desired lubricant as desired for the specific component.

Figure 6:
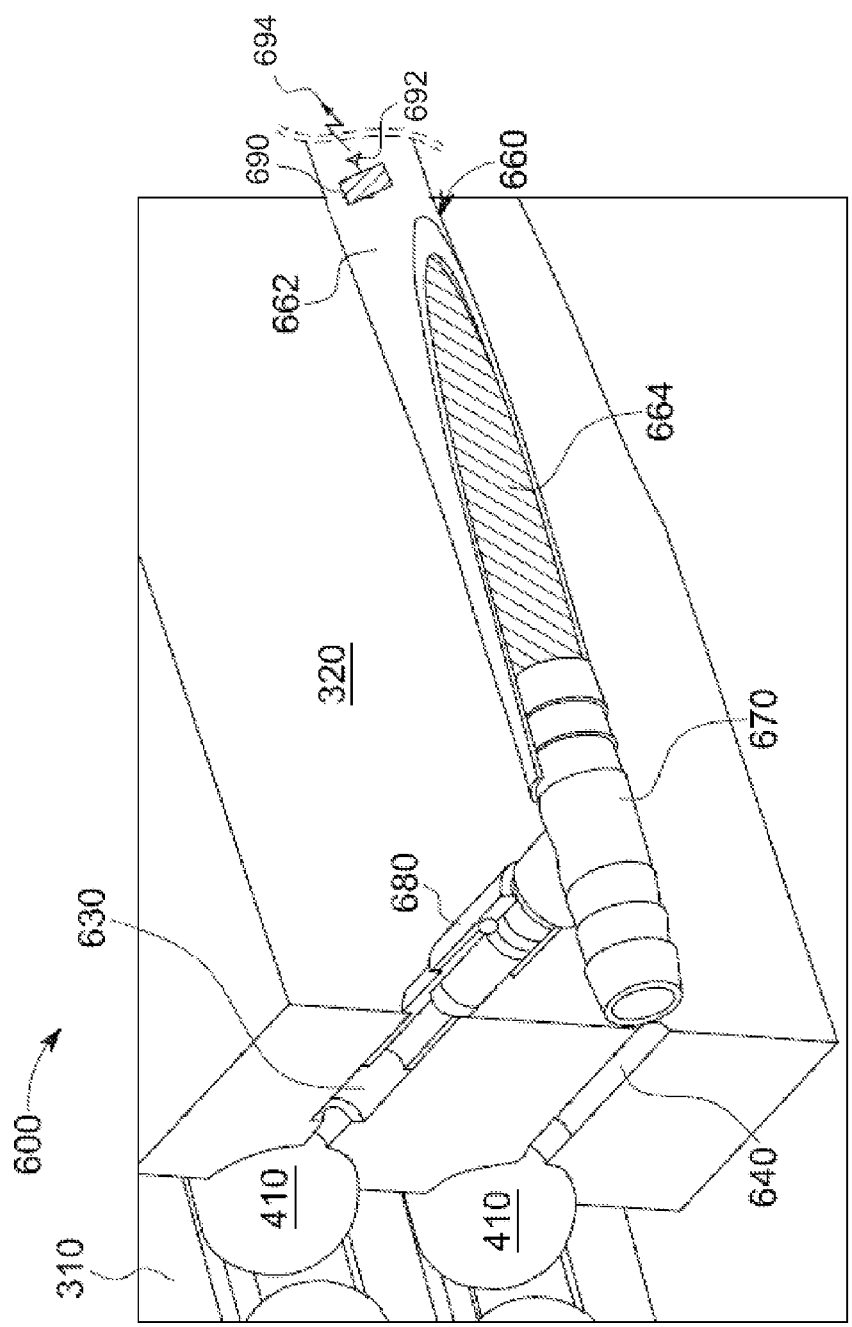
FIG. 6 illustrates a partial cut-away view of a portion of a lubrication system, according to an aspect of the present invention.

FIG. 6 illustrates a partial cut-away view of a portion of a lubrication system 600, according to an aspect of the present invention. A bearing includes rolling elements 410, inner flange 310 and outer flange 320. One or more input ports 630 and one or more output ports 640 are located in the outer flange 320. A lubrication receptacle 660 takes the form of a hose having an outer polyester cover jacket 662 and an inner elastomeric liner 664. The lubrication receptacle 660 may be attached to a connector 670, which may be a T-type connector or any other suitable connector. The connector 670 may be connected to an input connection 680, such as a quick connector or any other suitable connector.

The lubrication receptacle 660 may also include one or more sensors 690 that can be used to determine amount of lubricant contained within the lubrication receptacle 660. The sensors 690 may detect internal pressure, external pressure, tension or any other parameter that indicates or can be used to determine the amount of lubricant within the receptacle or the level of "fullness" of the lubricant receptacle 660. The sensors 690 may be attached to the lubrication receptacle 660 (i.e., internally and/or externally), and/or embedded within the lubrication receptacle. The sensors may also transmit a signal 694 via antenna 692 to control panel 112 or any other suitable control device. The signal 694 can be used to determine if and/or when the lubrication receptacle 660 should be serviced, cleaned, emptied or replaced. As one non-limiting example only, if the sensor 690 detected a full state of the lubrication receptacle 660, then a signal could be sent to a lubrication system to cease further addition of lubricant until the lubrication receptacle was serviced. The sensor 690 may take the form of any suitable device as desired in the specific application (e.g., a RFID device, etc.) and may communicate with the control panel 112 or other control device via wired or wireless communication. One or more sensors 690 may be equally and/or unequally distributed along the length of the lubrication receptacle(s) 660.

As one non-limiting example only, at least one sensor 690 may be used for detecting a parameter that indicates at least one of, the amount of lubricant within the lubricant receptacle 660, and/or the level of fullness of the lubricant receptacle 660. A signal 694 may be transmitted by the at least one sensor 690 to a control device 112 to indicate or notify if and/or when the lubrication receptacle 660 should be serviced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A lubrication system comprising:
   one or more input ports in a component;
   one or more output ports in the component;
   wherein an expandable lubrication receptacle is connected to the one or more output ports, the expandable lubrication receptacle comprising one or more hoses, and each of the one or more hoses is connected to a plurality of the one or more output ports, and wherein the one or more hoses comprise at least one collapsible-type hose, and the lubrication receptacle is configured for receiving a lubrication medium from the component.

2. The lubrication system of claim 1, wherein a diameter of the one or more input ports is smaller than a diameter of the one or more output ports.

3. The lubrication system of claim 1, wherein the collapsible-type hose comprises an outer polyester cover jacket and an inner elastomeric liner.

4. The lubrication system of claim 1, further comprising:
   a lubrication supply connected to the one or more input ports, the lubrication supply configured to supply the lubrication medium to the component.

5. The lubrication system of claim 1, wherein the component is at least one of:
   a bearing, a pitch bearing, a yaw bearing and a main bearing.

6. The lubrication system of claim 1, further comprising:
   at least one sensor for detecting a parameter that indicates at least one of, the amount of lubrication medium within the expandable lubrication receptacle, and the level of fullness of the expandable lubrication receptacle;
   wherein a signal may be transmitted by the at least one sensor to a control device to indicate if the expandable lubrication receptacle should be serviced.

7. A wind turbine comprising:
   a tower;
   a nacelle supported by the tower;
   a rotor including one or more rotor blades;
   a lubrication system comprising:
      one or more input ports in a component;
      one or more output ports in the component;
      wherein an expandable lubrication receptacle is connected to the one or more output ports, the expandable lubrication receptacle comprising one or more hoses, and each of the one or more hoses is connected to one or more output ports, and wherein the one or more hoses comprise at least one collapsible-type hose, and the expandable lubrication receptacle is configured for receiving a lubrication medium from the component.

8. The wind turbine of claim 7, wherein a diameter of the one or more input ports is smaller than a diameter of the one or more output ports.

9. The wind turbine of claim 7, wherein each of the one or more collapsible-type hoses comprise an outer polyester cover jacket and an inner elastomeric liner.

10. The wind turbine of claim 7, further comprising:
a lubrication supply connected to the one or more input ports, the lubrication supply configured to supply the lubrication medium to the component.

11. The wind turbine of claim 7, wherein the component is at least one of:
a bearing, a pitch bearing, a yaw bearing and a main bearing.

12. The wind turbine of claim 7, further comprising:
at least one sensor for detecting a parameter that indicates at least one of, the amount of lubrication medium within the expandable lubrication receptacle, and the level of fullness of the expandable lubrication receptacle;
wherein a signal is transmitted by the at least one sensor to a control device to indicate if the expandable lubrication receptacle should be serviced.

13. A lubrication system comprising:
one or more input ports in a component;
one or more output ports in the component;
wherein an expandable lubrication receptacle is connected to the one or more output ports, the expandable lubrication receptacle wrapping around at least a portion of the component, and wherein the expandable lubrication receptacle is configured for receiving a lubrication medium from the component; and
wherein the expandable lubrication receptacle comprises one or more collapsible-type hoses, and each of the one or more collapsible-type hoses is connected to a plurality of the one or more output ports.

14. The lubrication system of claim 13, wherein each of the one or more collapsible-type hoses comprise an outer polyester cover jacket and an inner elastomeric liner.

15. The lubrication system of claim 13, wherein a diameter of the one or more input ports is smaller than a diameter of the one or more output ports.

16. The lubrication system of claim 13, further comprising:
at least one sensor for detecting a parameter that indicates at least one of, the amount of lubrication medium within the expandable lubrication receptacle, and the level of fullness of the expandable lubrication receptacle;
wherein the component is at least one of a bearing, a pitch bearing, a yaw bearing and a main bearing; and
wherein a signal may be transmitted by the at least one sensor to a control device to indicate if the expandable lubrication receptacle should be serviced.

* * * * *